(12) United States Patent
Gasper

(10) Patent No.: US 8,588,578 B2
(45) Date of Patent: Nov. 19, 2013

(54) CONVERSION OF VIDEO DATA TO PLAYABLE FORMAT

(75) Inventor: Rich Gasper, Phoenix, AZ (US)

(73) Assignee: Transpacific Digidata, LLC, Wilmington, DE (US)

( * ) Notice: Subject to any disclaimer, the term of this patent is extended or adjusted under 35 U.S.C. 154(b) by 893 days.

(21) Appl. No.: 11/392,800

(22) Filed: Mar. 29, 2006

(65) Prior Publication Data

US 2007/0230920 A1    Oct. 4, 2007

(51) Int. Cl.
*H04N 5/76* (2006.01)
*H04N 5/84* (2006.01)
*H04N 5/89* (2006.01)

(52) U.S. Cl.
USPC ............................................. 386/239; 386/332

(58) Field of Classification Search
USPC ............................. 386/46, 95, 112, 125, 126
See application file for complete search history.

(56) References Cited

U.S. PATENT DOCUMENTS

| | | | |
|---|---|---|---|
| 6,411,771 B1* | 6/2002 | Aotake | 386/52 |
| 6,608,964 B1* | 8/2003 | Saito | 386/52 |
| 6,952,804 B2* | 10/2005 | Kumagai et al. | 715/723 |
| 6,999,512 B2* | 2/2006 | Yoo et al. | 375/240.03 |
| 7,028,329 B1* | 4/2006 | Mizutani | 725/109 |
| 7,039,116 B1* | 5/2006 | Zhang et al. | 375/240.26 |
| 7,149,788 B1* | 12/2006 | Gundla et al. | 709/218 |
| 8,117,342 B2* | 2/2012 | Heredia et al. | 709/246 |
| 2002/0059243 A1* | 5/2002 | Gillespie et al. | 707/10 |
| 2005/0197108 A1* | 9/2005 | Salvatore et al. | 455/414.3 |
| 2006/0021057 A1* | 1/2006 | Risan et al. | 726/26 |
| 2006/0036610 A1* | 2/2006 | Wang | 707/10 |
| 2007/0186002 A1* | 8/2007 | Campbell et al. | 709/231 |
| 2007/0226238 A1* | 9/2007 | Kiilerich et al. | 707/101 |

OTHER PUBLICATIONS

International Search Report, Aug. 25, 2008, Gianfranco Fiorio.
Int'l Prel. Rep. Patent.-IPRP, Sep. 30, 2008, Gianfranco Fiorio.

* cited by examiner

*Primary Examiner* — Gelek W Topgyal
(74) *Attorney, Agent, or Firm* — Turocy & Watson, LLP

(57) ABSTRACT

The present invention provides for a method for converting a video data file into a format usable by a portable video player that comprises, in a single selection on the video data file, ripping and deCSS the video data file if necessary 8, converting the video data file 10 into the format usable by the portable video player to produce a playable file, the file has a name prefix and a name suffix, renaming the name suffix to be compatible with the portable video player, and making the playable file accessible to the portable video player 12. Converting the video data file specifies the video format, the video aspect ratios the maximum video bit rate, the maximum video frame rate, the audio encoder type and the maximum audio bit rate. In a particular embodiment 36 the video format is H.264, the video aspect ratio is 320×240, maximum video bit rate is 768 kbps, the maximum video frame rate is 30 fps, the audio encoder is ACC-LC and the maximum audio bit rate is 160 kbps.

20 Claims, 2 Drawing Sheets

CONVERSION OF VIDEO DATA TO PLAYABLE FORMAT

BACKGROUND

The conversion of video data to different types of playable format, such as on an ipod™, require multiple steps that are unintuitive and lose video quality. What is needed is a system and method for converting different types of video data that is unusable in one type of medium, to be usable in that medium. This needs to be done with minimal or no loss of video quality and in a simple procedure.

Other difficulties with the prior art also exist, some of which will be apparent upon further reading.

SUMMARY OF THE INVENTION

With the foregoing in mind, methods and apparatuses consistent with the present invention, facilitate the conversion of a video file, with or without audio, to a format usable by a video player, such as a portable video and audio player. The process converts the video in a single selection step, although in some embodiments additional steps may be present to a user for enhanced features. The conversion retains video quality and properly syncs audio in the single selection step.

These and other objects, features, and advantages in accordance with the present invention are provided particular embodiments by a method for converting a video data file into a format usable by a portable video player that comprises, in a single selection on the video data file, ripping and deCSS the video data file if necessary, converting the video data file into the format usable by the portable video player to produce a playable file, the file has a name prefix and a name suffix, renaming the name suffix to be compatible with the portable video player, and making the playable file accessible to the portable video player. Converting the video data file specifies the video format, the video aspect ratios the maximum video bit rate, the maximum video frame rate, the audio encoder type and the maximum audio bit rate.

In a particular embodiment the video format is H.264, the video aspect ratio is 320×240, maximum video bit rate is 768 kbps, the maximum video frame rate is 30 fps, the audio encoder is ACC-LC and the maximum audio bit rate is 160 kbps.

In other particular embodiments the single selection on the video data also converts the video data file into an AVI format. In other embodiments the method further comprises a user determined video editing. Renaming the name prefix may also be performed.

In still another embodiment, making the playable file accessible to the portable video player comprises transferring the playable file to the video player, which comprises copying the playable file from a computer to a portable video player. Also, the computer retains a copy of the playable file. In particular embodiments, the portable video player is an iPod™.

In still another embodiment, the present invention provides for a method for converting a video data file into a format usable by a portable video player that comprises using a single selection on the video data file to perform the steps of ripping, and deCSS of the video data file if necessary, converting the video data file into the format usable by the portable video player to produce a playable file, and making the playable file accessible to the portable video player by transferring the playable file to the video player which comprises copying the playable file from a computer to a portable video player. Converting the video data file specifies the video format, the video aspect ratios, the maximum video bit rate, the maximum video frame rate, the audio encoder type, and the maximum audio bit rate.

In particular embodiments the file has a name prefix and a name suffix and the name suffix is renamed to be compatible with the portable video player. The portable video player is an iPod™. The video format is H.264, the video aspect ratio is 320×240, maximum video bit rate is 768 kbps, the maximum video frame rate is 30 fps, the audio encoder is ACC-LC and the maximum audio bit rate is 160 kbps.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

The present invention provides for a system and method for converting video data files so that they can be viewed on video players that have different file requirements than the original video data file. The present invention performs this conversion at a higher quality and with greater simplicity than the prior art.

In the prior art, video players, such as an Apple™ ipod™ player requires a complex series of steps to convert a video file into a playable video file. This is not only time consuming, but a loss of video quality also occurs. The present invention saves on time and retains video quality. With the present invention, video files, which typical come in AVI, VOB and MPEG data files are converted into a playable file, such as an M4V format file. This playable file is then transferred to a video player, such as an ipod™.

Figure 1:
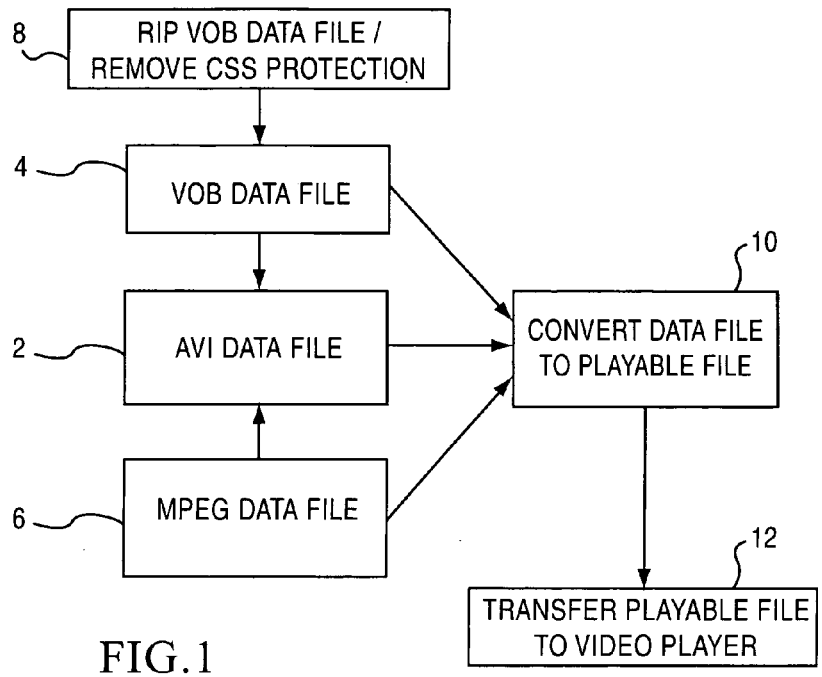
FIG. 1 illustrates an overview of one embodiment of the present invention.

FIG. 1 illustrates this concept. A video data file, such as an AVI data file 2 is converted to a playable file 10, the details of which will be discussed below. Other types of video data files are also in use, such as VOB data file 4 and MPEG data files 6, which may either be first converted into AVI format, or converted directly into a playable file. The common format for MPEG data files is MPEG-2, but MPEG-1 is also in use. Video data files present on media such as DVDs usually have encryption, special formatting, protection, indexing codes, etc which need to be removed. This is normally performed through processes known as RIP (aka ripping/ripper) and/or CSS removes (aka DECESS) 8. Programs that can perform this function include DECSS™, AutoGK™, CladDVD™, SmartRipper™, and VCD Galaxy™.

The present invention may use these separate programs, or it may also incorporate a similar RIP/DECSS feature into the broader program structure so that a single selection on the file will identify the program, where necessary perform a RIP/DECSS function, and convert the data file to a playable file. The same single selection, or/and additional selection can then transfer the playable file to the video player. In many cases the file will also be renamed, since players often have restrictions based on the name of a file. For example, "greatest hits.avi" for play on an iPod™ will be renamed "greatest hits.m4v" so that the iPod™ will recognize it. There can also be an option to personalize the name, for example, "greatest hits.avi" can be changed to "john's pick.m4v."

Therefore, although the present invention embodies a single selection method, where a user may select a file and a program performing the present invention will have it readied for use in a video player, additional steps to enhance the data file may also be present. The ability to change the name of the file is one. Additionally, editing the software may also be made available. Common types of video editing software include Adobe Premier™, Media Cleaner™, and Virtual Dub™. A program created with the present invention can use code similar to these packages, or can even drop these packages into its framework. Changes to the videos can include adding or removing start and stop points, transitions, merging and dividing files. These video edits can equally affect audio. Yet another user choice may be to keep various copies of the data file, both the source and the converted, in various locations.

Figure 2:
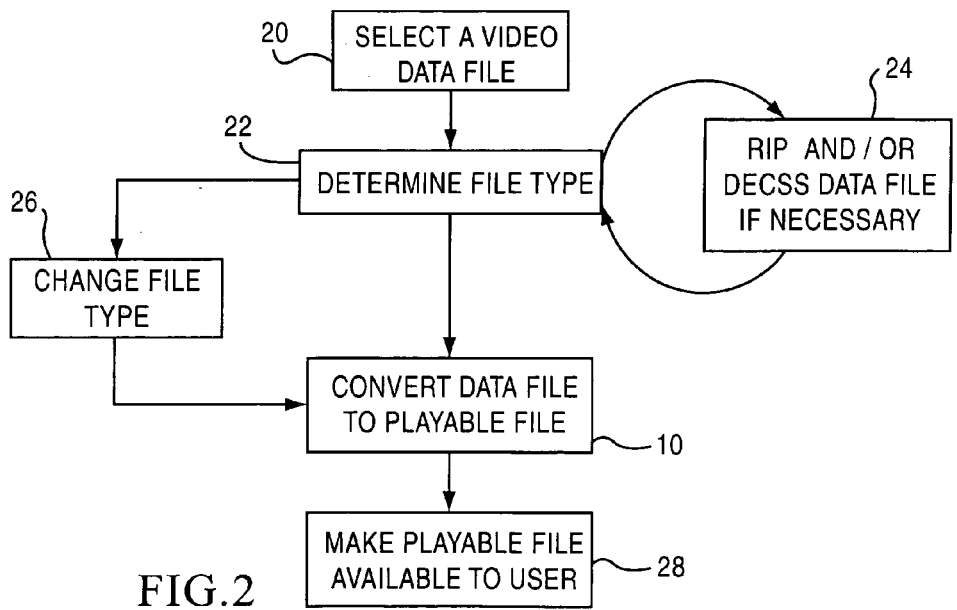
FIG. 2 illustrates another overview of an embodiment of the present invention.

Referring to FIG. 2, the process of how a computer program of the present invention converts a video data file is illustrated. The program selects a video data file 20, which is typically selected based on some form of user input. The program then determines the file type 22, and if necessary performs RIP and/or DECSS if necessary 24. Depending on the data file type, it may first be changed into a more easily converted file 26, such as a VOB or MPEG-2 to AVI, but this step is not always necessary. Depending on the conversion subroutines, they may be able to convert directly from VOB or MPEG-2.

Then the data file is converted to a playable file 10. Playable file, as used herein, refers to the ability to play the data file on a desired type of video player not previously able to play the video data file. VOB and AVI files can indeed be played on some types of video players, but directly on other types, such as ipods™, and especially not without a loss of quality. The conversion of the data file to a playable file can either retain a copy of the original data file or fully convert it to a new playable file without retaining the original. The playable file is then made available to the user 28, which can take several forms, such as a new file, icon, link or the direct transfer of the playable file to a video player (if the video player did not perform the conversion).

The ability to convert a video format to a playable format are done by programs/subroutines known as converters. Ideal converters for this process are Avlsynth™ and ffmpeg, although others also exist.

The type of playable file used by ipods and similar devices are known as M4V files. This, however, is an umbrella category that actually uses H.264 or MPEG-4 encoding standards. Either the H.264 or the MPEG-4 may be designated an M4V file and be played on an ipod or similar device. Within the H.264 or MPEG-4 encoding techniques there are various resolution aspect ratios that a converted video data file can assume. These include:

H.264 MPEG-4
480×160 784×288
432×176 752×304
400×192 720×320
368×208 672×336
336×224 640×352
320×240 624×368
288×256 592×384
272×272 576×400
480×480

Certain video players like the ipod™ function better at specified aspect ratios. For example, current ipods™ function better at 320×240 H.264 resolution and 480×480 MPEG-4 resolution, with the 320×240 resolution currently being the best for ipods™. Therefore the conversion of the data file into the playable file will pre-select for one of these resolutions. Further, since H.264 produces a higher quality video for a given file size, particular embodiments will use the H.264 encoding over the MPEG-4. An H.264 encoding, however, typically requires more encoding time.

Other factors such as maximum bitrate and maximum framerate also effect how a converted file performs on a video player. For an ipod™, having a maximum bitrate of 768 kbps and a maximum framerate of 30 fps results in a smoother running video. Other optimal resolution, bitrate and framerate can be determined by industry standards or through experimentation. In various embodiments these parameters can be adjusted by a user.

For audio components in the data file, the conversion will change their particular data to standard AAC-LC format. Also, a maximum bitrate for the audio may be attributed. For an ipod™, the maximum bitrate should be 160 kbps.

Figure 3:
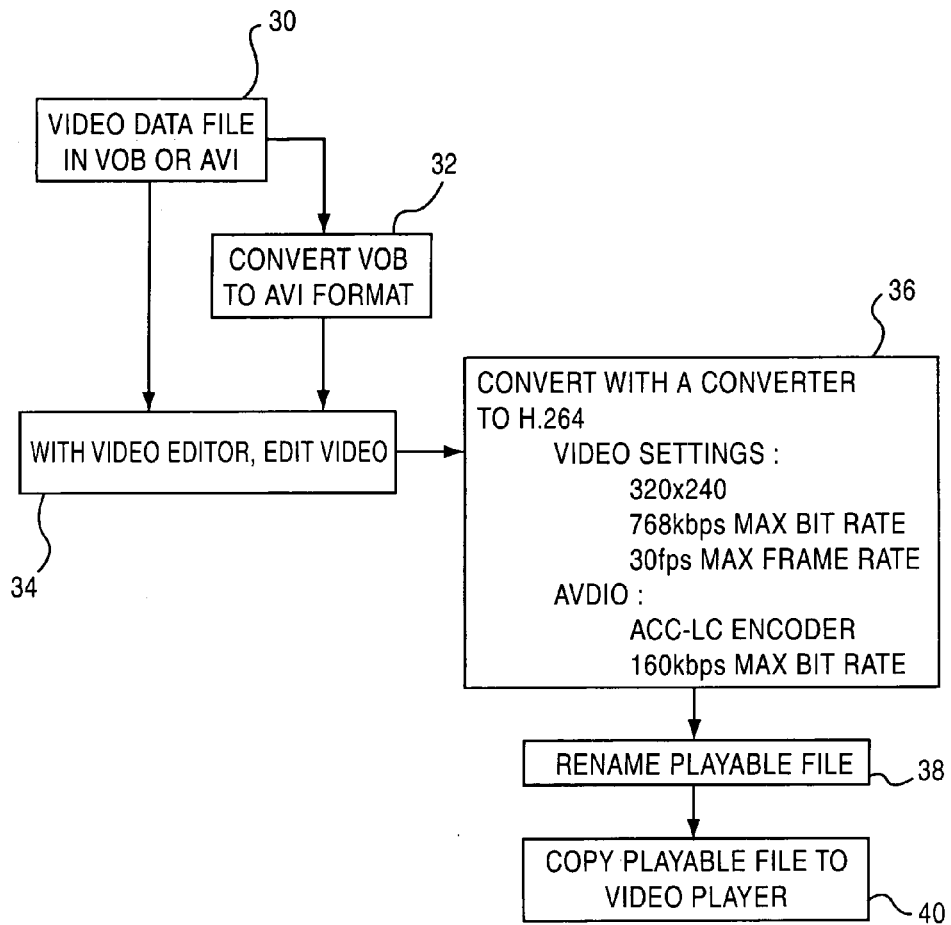
FIG. 3 illustrates still another overview of an embodiment of the present invention.

FIG. 3 illustrates the present invention with focus on some of the features discussed. A video data file 30 that does not need to be ripped or deCSS is present in either VOB or AVI. Although it is possible to proceed with a VOB format, it is preferable to convert any VOB file to AVI format 32. In this embodiment, the user is then allowed to edit the video 34. The video is then converted 36 to H.264 format with specified video and audio setting. The ACC-LC encoder allows for the audio to be synced with the video without further manipulation by the user. The file name is then changed 38, and a copy 40 is made available to a video player.

In one embodiment the present invention provides for a method for converting a video data file into a format usable by a portable video player that comprises, in a single selection on the video data file, ripping and deCSS the video data file if necessary, converting the video data file into the format usable by the portable video player to produce a playable file. The file has a name prefix and a name suffix, renaming the name suffix to be compatible with the portable video player, and making the playable file accessible to the portable video player. Converting the video data file specifies the video format, the video aspect ratios the maximum video bit rate, the maximum video frame rate, the audio encoder type and the maximum audio bit rate.

In a particular embodiment the video format is H.264, the video aspect ratio is 320×240, maximum video bit rate is 768 kbps, the maximum video frame rate is 30 fps, the audio encoder is ACC-LC and the maximum audio bit rate is 160 kbps.

In other particular embodiments the single selection on the video data also converts the video data file into an AVI format. In other embodiments the method further comprises a user determined video editing. Renaming the name prefix may also be performed.

In still another embodiment making the playable file accessible to the portable video player comprises transferring the playable file to the video player, which comprises copying the playable file from a computer to a portable video player. Also, the computer retains a copy of the playable file. In particular embodiments, the portable video player is an iPod™.

In still another embodiment, the present invention provides for a method for converting a video data file into a format usable by a portable video player that comprises using a single selection on the video data file to perform the steps of ripping, and deCSS of the video data file if necessary, converting the video data file into the format usable by the portable video player to produce a playable file, and making the playable file accessible to the portable video player by transferring the playable file to the video player which comprises copying the playable file from a computer to a portable video player. Converting the video data file specifies the video format, the video aspect ratios, the maximum video bit rate, the maximum video frame rate, the audio encoder type, and the maximum audio bit rate.

In particular embodiments the file has a name prefix and a name suffix and the name suffix is renamed to be compatible with the portable video player. The portable video player is an iPod™. The video format is H.264, the video aspect ratio is 320×240, maximum video bit rate is 768 kbps, the maximum video frame rate is 30 fps, the audio encoder is ACC-LC and the maximum audio bit rate is 160 kbps.

As discussed above, the various sub features, such as ripping, editing and converting can be performed by writing these features into a unified program, or the various prewritten programs discussed can be dropped in using a GUI.

AVI is also referred to as audio video interleave. Within an AVI file are two distinct process, kept synced by key framing or similar techniques such as internal time coding so the two processes keep up with each other, i.e., both processes are tracks of data that have a timer linked and are constantly verified.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method, comprising:
employing a computer processor to execute instructions retained in a computer-readable storage medium to perform operations, comprising:
receiving a selection of a video data file;
in response to the receiving the selection of the video data file, determining whether the video data file includes data represented according to a video object (VOB) format;
in response to determining that the video data file includes data represented according to the VOB format, converting the video data file into a playable file having an audio video interleave (AVI) format; and
in response to the converting the video data file, transferring the playable file to a portable video player device, wherein the converting the video data file into the playable file further includes formatting the video data file based on a H.264 standard having a video aspect ratio of 320 ×240 and a maximum video bit rate of 768 kilobits per second, and employing an advanced audio coding type encoder having a maximum audio bit rate of 160 kilobits per second.

2. The method of claim 1, further comprising:
in response to the receiving the selection of the video data file, renaming the video data file to be compatible with the portable video player device.

3. The method of claim 1, further comprising:
receiving another selection of the video data file; and
in response to receiving the other selection, editing the video data file, wherein the editing includes at least one of adding a first set of at least one of start points or stop points, removing a second set of at least one of start points or stop points, adding a set of transition effects, merging the video data file with another file, or dividing the video data file.

4. A method, comprising:
receiving, by a system including at least one processor, a selection of a video data file;
in response to determining that the video data file is associated with a format different from a video object (VOB) format and an audio video interleave (AVI) format, extracting, by the system, information from the video data file, converting, by the system based on the information, the video data file into a playable file having a usable format executable by a portable device, and facilitating, by the system, an access of the playable file by the portable device, wherein the converting the video data file into the playable file includes formatting the video data file based on a H.264 standard having a video aspect ratio of 320×240 and a maximum video bit rate of 768 kilobits per second, and employing an advanced audio coding type encoder having a maximum audio bit rate of 160 kilobits per second; and
in response to determining that the video data file is associated with the VOB format, converting the video data file into another playable file having the AVI format that is executable by the portable device.

5. The method of claim 4, further comprising at least one of:
adding, by the system, a first set of at least one of start points or stop points to the video data file;
removing, by the system, a second set of at least one of start points or stop points from the video data file;
adding, by the system, a set of transition effects to the video data file;
merging, by the system, the video data file with another file; or
dividing, by the system, the video data file into portions.

6. The method of claim 4, further comprising in response to the receiving the selection of video data file, renaming, by the system, a name prefix of the video data file.

7. The method of claim 4, wherein the facilitating the access of the playable file further includes facilitating copying the playable file from a first device to the portable device.

8. The method of claim 7, wherein the facilitating the copying further includes facilitating, by the system, retaining a copy of the playable file at the first device.

9. The method of claim 7, wherein the facilitating the copying further includes facilitating copying the playable file from the first device to at least one of a portable music player or a portable video player.

10. A system, comprising:
a memory that stores computer-executable instructions;
a processor, communicatively coupled to the memory, that facilitates execution of the computer-executable instructions to at least:
receive a first instruction associated with a video file;
in response to a determination that the video file is associated with a format distinct from an audio video interleave (AVI) format and a video object (VOB) format, extract data from the video file, format the video file to obtain a formatted video file based on the data to facilitate a use of the formatted video file by a first device, and transfer the formatted video file to the first device; and
in response to a determination that the video file is associated with the VOB format, converting the video file into a playable file having the AVI format to facilitate a use of the playable file by the first device.

11. The system of claim 10, wherein the processor further facilitates the execution of the computer-executable instructions to:
receive a second instruction associated with the video file; and
in response to reception of the second instruction, facilitate editing of the video file.

12. The system of claim 10, wherein the processor further facilitates the execution of the computer-executable instructions to format the video file to be playable by at least one of a portable music player or portable video player.

13. The system of claim 10, wherein the processor further facilitates the execution of the computer-executable instructions to:
receive a second instruction associated with the video file; and
in response to receiving the second instruction, editing the video file, wherein the editing includes at least one of adding a first set of at least one of start points or stop points, removing a second set of at least one of start or stop points, adding a set of transition effects, merging the video file with another file, or dividing the video file.

14. The system of claim 10, wherein the processor further facilitates the execution of the computer-executable instructions to:
format the video file to obtain the formatted video file based on a H.264 standard, a video aspect ratio of 320× 240, and a maximum video bit rate of 768 kilobits per second; and
employ an advanced audio coding type encoder based on a maximum audio bit rate of 160 kilobits per second.

15. A non-transitory computer readable storage medium comprising computer executable instructions that, in response to execution, cause a computing system including at least one processor to perform operations, comprising:
receiving a selection regarding a video;
in response to receiving the selection and determining that the video is associated with a format distinct from an audio video interleave (AVI) format and a video object (VOB) format, ripping and deCSSing the video, formatting the video to a format usable by a portable video player, and copying the formatted video to the portable video player; and
in response to determining that the video is associated with the VOB format, converting the video into the AVI format to obtain a playable file usable by the portable video player.

16. The non-transitory computer readable storage medium of claim 15, wherein the operations further comprise adding metadata to the video.

17. The non-transitory computer readable storage medium of claim 15, wherein the copying the formatted video to the portable video player further includes retaining a copy of the formatted video in the non-transitory computer readable storage medium.

18. The non-transitory computer readable storage medium of claim 15, wherein the operations further comprise editing the video including at least one of adding a first set of at least one of start or stop points, removing a second set of at least one of start points or stop points, adding a set of transition effects, merging the video data file with another file, or dividing the video data file.

19. The non-transitory computer readable storage medium of claim 15, wherein the formatting the video further includes:
formatting the video based on a H.264 standard, a video aspect ratio of 320×240, and a maximum video bit rate of 768 kilobits per second; and
employing an advanced audio coding type encoder based on a maximum audio bit rate of 160 kilobits per second.

20. The non-transitory computer readable storage medium of claim 15, wherein the operations further comprise:
receiving a user selection regarding the video; and
in response to receiving the user selection, facilitating editing of the video.

* * * * *